(12) United States Patent
Ruhl et al.

(10) Patent No.: US 11,772,212 B2
(45) Date of Patent: Oct. 3, 2023

(54) METHOD FOR PRODUCING AN ALUMINUM CYLINDRICAL HOLLOW BODY FOR A VEHICLE TRANSMISSION AND A CYLINDRICAL HOLLOW BODY

(71) Applicant: ZF Friedrichshafen AG, Friedrichshafen (DE)

(72) Inventors: Christian Ruhl, Friedrichshafen (DE); Helmut Boehm, St. Ingbert (DE); Martin Brehmer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 57 days.

(21) Appl. No.: 17/612,447

(22) PCT Filed: May 19, 2020

(86) PCT No.: PCT/EP2020/063981
§ 371 (c)(1),
(2) Date: Nov. 18, 2021

(87) PCT Pub. No.: WO2020/234306
PCT Pub. Date: Nov. 26, 2020

(65) Prior Publication Data
US 2022/0241908 A1    Aug. 4, 2022

(30) Foreign Application Priority Data

May 20, 2019   (DE) .......................... 102019207311.5

(51) Int. Cl.
*B23P 15/14* (2006.01)
*B22D 25/02* (2006.01)
(Continued)

(52) U.S. Cl.
CPC .............. *B23P 15/14* (2013.01); *B22D 25/02* (2013.01); *B23P 2700/50* (2013.01); *C22C 21/02* (2013.01); *F16H 2055/176* (2013.01)

(58) Field of Classification Search
CPC ...... F16H 57/02; F16H 57/023; F16H 57/043; F16H 2055/176; F16H 2057/02043;
(Continued)

(56) References Cited

FOREIGN PATENT DOCUMENTS

| DE | 102011056942 B3 | 5/2013 |
| DE | 102015203033 A1 | 8/2016 |
| DE | 102016219306 A  | 4/2018 |

OTHER PUBLICATIONS

International Search Report and Written Opinion for PCT/EP2020/063981 dated Aug. 18, 2020 (11 pages; with English translation).
(Continued)

*Primary Examiner* — Moshe Wilensky
(74) *Attorney, Agent, or Firm* — Kristin L. Murphy

(57) ABSTRACT

The relates to a method for producing and machining a cylindrical hollow body constructed of aluminium or an aluminium alloy and for arranging said hollow body in a motor vehicle transmission. The hollow body is produced by a casting process such that the hollow body has an inner and an outer lateral surface and has teeth in at least one sub-region of the inner lateral surface. For machining, the hollow body is centrally clamped. The hollow body is arranged in the vehicle transmission by tooth flanks of the internal teeth. In the disclosed method according to the disclosure, the hollow body is centrally clamped at a tip diameter of the internal teeth. The disclosure further relates to a corresponding cylindrical hollow body and to a corresponding vehicle transmission.

18 Claims, 1 Drawing Sheet

(51) Int. Cl.
*C22C 21/02* (2006.01)
*F16H 55/17* (2006.01)

(58) Field of Classification Search
CPC ........ C22C 21/02; B22D 25/02; B22D 17/00; B23P 2700/50; B23P 15/14; B23P 15/00
See application file for complete search history.

(56) References Cited

OTHER PUBLICATIONS

Heinz Linke: Zahnräder und Zahnradgetriebe. Konstruktionselemente des Maschinenbaus 2. Berlin, Heidelberg : Springer, 2006. 369-569.—ISBN 978-3-540-29630-0.

METHOD FOR PRODUCING AN ALUMINUM CYLINDRICAL HOLLOW BODY FOR A VEHICLE TRANSMISSION AND A CYLINDRICAL HOLLOW BODY

CROSS-REFERENCE TO RELATED APPLICATIONS

This application is a national stage of International Application No. PCT/EP2020/063981, filed May 19, 2020, the disclosure of which is incorporated herein by reference in its entirety, and which claimed priority to German Patent Application No. 102019207311.5, filed May 20, 2019, the disclosure of which is incorporated herein by reference in its entirety.

TECHNICAL FIELD

The present disclosure relates to a method for producing and machining a cylindrical hollow body of aluminium or an aluminium alloy and for arranging said hollow body in a motor vehicle transmission. The present disclosure also relates to a corresponding cylindrical hollow body and to a corresponding vehicle transmission.

BACKGROUND

In the automobile construction sector, the increasing use of components made of lightweight materials for reasons of reducing the weight of a vehicle and, consequently, of saving fuel and of reducing $CO_2$ emissions is known. Since such components replace conventional components, for example components made of steel, they must, however, meet the same requirements in respect of their mechanical load-bearing capacity, their corrosion resistance and ideally also in respect of their machinability and their production costs. In this context, different aluminium alloys, whose properties can be specifically adjusted within a certain range by different alloy constituents, have proven to be particularly suitable. Here, the components produced from the different aluminium alloys are usually produced as castings, with high demands being placed on the geometric properties of the components and, in particular, on their geometric precision. As a rule, finish-machining of the components cast from aluminium or an aluminium alloy is therefore necessary.

In this context, DE 10 2011 056 942 B3 discloses a method for producing a thin-walled and cylindrical component from aluminium or from an aluminium alloy. In this case, the component is first produced by diecasting. Subsequently, the component is damped centrally in an unfinished state, and its inner surface and its outer surface are finish-turned with a cutting action. The only exception to the finish-turning is a subregion on which the component is damped. Finally, the component is rotated in order to determine any unbalance present. In order to reduce or eliminate the unbalance, the component is then provided with compensating bores. The sub-region which has remained unmachined during a finish-turning likewise serves as a bearing surface for clamping the component during the finish turning process or during balancing, and also as a bearing surface for installation of the component in an assembly.

However, the production method known from DE 10 2011 056 942 B3 has a disadvantage that the tooth flanks of a tooth system are best suited as bearing surfaces for installation in a more complex assembly, for example a transmission, since a torque can be reliably transmitted via these. Clamping on the tooth flanks for the balancing process, on the other hand, is comparatively complicated.

What is needed, is an improved method for producing and machining a cylindrical hollow body that includes aluminium or an aluminium alloy and for arranging said hollow body in a motor vehicle transmission.

SUMMARY

According to the disclosure, a method for producing and machining a cylindrical hollow body that includes aluminium or an aluminium alloy is disclosed, as well as for arranging said hollow body in a motor vehicle transmission. Advantageous exemplary arrangements and developments of the disclosure will become apparent from the foregoing description.

The disclosure relates to a method for producing and machining a cylindrical hollow body constructed of aluminium or an aluminium alloy and for arranging said hollow body in a motor vehicle transmission. According to one exemplary arrangement of the disclosure, the hollow body is produced by a casting process in such a way that the hollow body has an inner and an outer lateral surface and has an internal tooth system in at least one subregion of the inner lateral surface. For machining, the hollow body is centrally damped. The hollow body is arranged in the vehicle transmission exclusively by tooth flanks of the internal tooth system. The method according to one exemplary arrangement the is distinguished by the fact that the hollow body is damped centrally on a tip circle diameter of the internal tooth system.

According to the disclosure, it is therefore envisaged that first of all a cylindrical hollow body is cast either from aluminium or from an aluminium alloy by a known casting process. According one exemplary arrangement of the disclosure, it is not necessary to fix on a specific casting process as long as the casting process is suitable in principle for casting hollow bodies constructed of aluminium or of an aluminium alloy. Since this is a cylindrical hollow body, it has a round cross section and an inner and an outer lateral surface. In addition, an internal tooth system is provided in at least one, preferably annular, circumferential subregion of the inner lateral surface. In one exemplary arrangement, the cylindrical hollow body has a tubular design, that is to say in one exemplary arrangement, the hollow body has two open axial ends, by which, for example, machining of the inner lateral surface is also possible in a simple manner. In one exemplary arrangement, both the inner and the outer lateral surface can advantageously have surface contours, for example in the form of circumferential grooves, applied, circumferential collars, notches, beads, bores or the like. In order to simplify the machining of the hollow body following production, central clamping of the hollow body is envisaged. For this purpose, clamping devices are known from the prior art which permit central clamping of a cylindrical hollow body constructed of aluminium or of an aluminium alloy. According to the disclosure, the central clamping is in this case carried out exclusively on a tip circle diameter of the tooth system, i.e. clamping jaws or clamping fingers of the clamping device use the surface on the tooth tips of the internal tooth system as a bearing surface for clamping the hollow body. This results in a uniform, radially outwardly acting clamping force, which avoids unwanted deformation of the hollow body. In addition, particularly as compared with DE 10 2011 056 942 B3, this arrangement results in an advantage that the clamping process leads to a reliably reproducible alignment of the hollow body. The subsequent machining can take different forms and extents here, it being conceivable, for example, that the hollow body is only polished. However, comparatively complex machining, for example cutting, is also conceivable. The arrangement of the hollow body in the vehicle transmission is then accomplished in one exemplary arrangement, exclusively by way of the tooth flanks of the internal tooth system, which make surface contact with correspondingly designed flanks of mating tooth system in the vehicle transmission. Torques are accordingly transmitted via the flanks of the internal tooth system and the flanks of the mating tooth system. The hollow body can, for example, assume the function of a hollow shaft in the vehicle transmission.

Since the hollow body is centrally clamped on a tip circle diameter of the tooth system for machining, and the arrangement of the hollow body in the vehicle transmission takes place via the tooth flanks of the internal tooth system, different surfaces of the internal tooth system are therefore used for the machining and the arrangement of the hollow body. This leads to an advantage that the most suitable regions of the hollow body can be used both for clamping in the course of machining and for the arrangement of the hollow body. Since both the tooth flanks and the tooth tips are components of the same internal tooth system and are produced together in the same process step, namely the casting process, the two are aligned with one another as precisely as possible, with the result that axes of rotation for the hollow body for clamping during machining and during arrangement in the vehicle transmission are not different.

According to one exemplary arrangement of the disclosure, provision is made for the casting process to be carried out as a diecasting process. In this case, the aluminium or the aluminium alloy may be first introduced in liquid form into a corresponding filling chamber of a casting apparatus, wherein the filling chamber is filled under pressure by applying pressure to the aluminium or the aluminium alloy by a casting piston. The application of pressure is advantageously continued until the aluminium or the aluminium alloy has solidified. It is thereby possible to produce comparatively precise geometric shapes with only a low reject rate.

According to a further exemplary arrangement of the disclosure, provision is made for the inner and/or the outer lateral surface to be finish-turned as part of the machining of the hollow body, but for the at least one subregion to remain un-finish-turned. In one exemplary arrangement, the at least one subregion does not only remain un-finish-turned but remains completely unprocessed by machining. This results in an advantage that the geometry of the cast hollow body is finish-machined as far as necessary, making it possible to achieve extremely precise shaping. Here, the geometric precision achievable by machining is generally higher than the geometric precision achievable by a casting process. Since the hollow body is intended for use in a vehicle transmission and, in that context, in one exemplary arrangement, for transmitting torques or rotational speeds, good true running properties and thus a high geometric precision are important prerequisites. In this case, the subregion having the internal tooth system is not finish-turned for the very reason that the hollow body is clamped here in the region of the tip circle and this subregion is therefore not accessible for a turning tool. Subsequent reclamping on another region of the surface of the hollow body and, associated therewith, finish-turning of the tooth tips of the internal tooth system in the subregion would admittedly be possible but would entail additional effort and thus additional costs and should therefore be avoided. In addition, reclamping on another region of the surface of the hollow body as well as associated finish-turning of the tooth tips of the internal tooth system could lead to the hollow body as such having a different axis of rotation than the tip circle of the internal tooth system, which in turn would have a disadvantageous effect on the true running properties in the vehicle transmission.

According to a further exemplary arrangement of the disclosure, provision is made for the hollow body to be balanced as part of the machining process. Balancing in the sense according to the disclosure also includes the determination of unbalances and their elimination. The elimination of the unbalances need not necessarily be complete, but must at least go so far that a specified maximum permissible unbalance is no longer exceeded. Very smooth running of the hollow body can thus be achieved by balancing, which in turn contributes to lower noise emissions and a longer service life of the vehicle transmission in which the hollow body is arranged. Here, in one exemplary arrangement, balancing is carried out by machining, in that material is removed selectively at the points of the hollow body which lead to the respectively determined unbalance. The removal of material in turn is accomplished by drilling openings of larger or smaller dimensions through the lateral surfaces of the hollow body, wherein a diameter of the respectively provided drilled opening can be dependent on the severity of the unbalance determined. These drilled openings accordingly serve as balancing bores. In one exemplary arrangement, the unbalances are determined by a device suitable for this purpose and known per se for determining the unbalances. Since balancing takes place as part of the machining process, the hollow body is clamped on the tip circle diameter of the internal tooth system during this process.

According to a further exemplary arrangement of the disclosure, provision is made for the production of the hollow body to take place in a manner adapted to the vehicle transmission in such a way that the tip circle diameter remains contact-free after the hollow body has been arranged in the vehicle transmission. This means therefore that the tooth tip surfaces of the internal tooth system are not in contact with or do not bear against contact points or contact surfaces of any element of the vehicle transmission. On the contrary, the tooth tip surfaces of the internal tooth system serve exclusively for centrally clamping the hollow body during the machining of the hollow body. This results in the advantage that only the flanks of the internal tooth system, which are suitable for this purpose, are used for transmitting torques. The tip circle diameter of the internal tooth system is thus not used to transmit torques in the vehicle transmission and, accordingly, does not have to have any properties required for this purpose. On the contrary, the tooth tip diameter of the internal tooth system serves exclusively for clamping during the machining of the hollow body.

According to a further exemplary arrangement of the disclosure, provision is made for production of the hollow body to take place in such a way that the hollow body has an internal tooth system in each of two subregions of the inner lateral surface. This results in the advantage that the hollow body can advantageously be used for transmitting torques in the vehicle transmission. In this context, a first internal tooth system serves as an input for the torque to be transmitted, while a second internal tooth system serves as an output for the torque to be transmitted.

According to a further exemplary arrangement of the disclosure, provision is made for the hollow body to be deburred and/or brushed and/or washed as part of the machining of the hollow body. In this case, the hollow body can be brushed or washed both before balancing and after balancing. Deburring, on the other hand, preferably takes place after balancing since all burrs can thus advantageously be removed, including those which have been produced by any balancing bores that have been introduced. This makes it possible to ensure that any material particles or burrs which may be present do not get into the vehicle transmission and adversely affect the efficiency of the vehicle transmission.

The disclosure furthermore relates to a cylindrical hollow body constructed of aluminium or an aluminium alloy. The hollow body according to the disclosure is distinguished by the fact that the hollow body is produced by the method according to the disclosure. This also results in the advantages already mentioned in connection with the method according to the disclosure for the hollow body according to the disclosure.

Finally, the disclosure also relates to a vehicle transmission. The vehicle transmission according to the disclosure is distinguished by the fact that the vehicle transmission comprises at least one cylindrical hollow body according to the disclosure. This leads to the advantages already described.

BRIEF DESCRIPTION OF DRAWINGS

The disclosure is explained by way of example below with reference to exemplary arrangements illustrated in the figures, of which.

DETAILED DESCRIPTION

Identical objects, functional units and comparable components are desig-nated with the same reference signs across the figures. These objects, functional units and comparable components are of identical design in respect of their technical features, unless the description explicitly or implicitly states otherwise.

Figure 1:
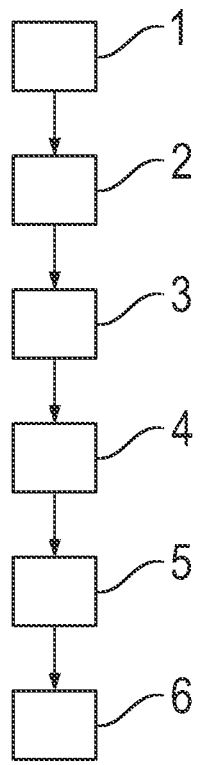
FIG. 1 shows, by way of example, one possible arrangement of a method according to the disclosure for producing and machining a cylindrical hollow body constructed of aluminium or an aluminium alloy and for arranging said hollow body in a motor vehicle transmission.

FIG. 1 shows, by way of example, one possible arrangement of a method according to the disclosure for producing and machining a cylindrical hollow body 20 constructed of aluminium or an aluminium alloy and for arranging said hollow body in a motor vehicle transmission 29. Here, in method step 1, the hollow body 20 is first of all produced by a casting process, for example by a diecasting process. In accordance with a casting die used or in accordance with a filling chamber of the casting die, production takes place in such a way that the hollow body 20 has an inner and an outer lateral surface 21, 22 and, for example, has in each case an internal tooth system 24 and 24' in two subregions 23 and 23' of the inner lateral surface 21. In addition, the production of the hollow body 20 in step 1 takes place in a manner adapted to the vehicle transmission 29 in such a way that a tip circle diameter 25 of the internal tooth systems 24 and 24' remains contact-free after the arrangement of the hollow body 20 in the vehicle transmission 29.

For the machining of the hollow body 20, the hollow body 20 is then clamped centrally in step 2. In the exemplary arrangement shown, central clamping takes place exclusively on the un-finish-turned or unmachined tip circle diameters 25 and 25' of the internal tooth systems 24 and 24'.

In method step 3, both the inner lateral surface 21 and the outer lateral surface 22 are finish-turned as part of the machining of the hollow body 20. However, the subregions 23 and 23', which have the internal tooth systems 24 and 24', remain un-finish-turned or unmachined in this case since here the hollow body 20 is clamped in each case in the region of the tip circle diameter 25. The finish-turning of the inner and outer lateral surfaces 21, 22 takes place, for example, by a turning device designed for this purpose.

In the following method step 4, the hollow body 20 is again clamped and balanced in each case on the tip circle diameter 25 of the internal tooth systems 24 and 24'. As part of the balancing process, unbalances of the hollow body 20 are first of all determined, this being accomplished by a device, designed for this purpose, for determining unbalances. If an impermissible unbalance is detected during this process, excess material on the hollow body 20, which causes the concentricity error, is removed as part of the balancing process. The removal of the excess material is carried out, for example, by setting balancing bores 34 through the inner and outer lateral surfaces 21, 22. In a subsequent method step 5, the hollow body 20 is deburred, brushed and washed in order to remove any burrs and contaminants that may be present.

Finally, in method step 6, the hollow body 20 is arranged in the vehicle transmission 29, wherein arrangement is accomplished exclusively via tooth flanks 27 of the internal tooth systems 24 and 24'. Particularly between the tooth tip surfaces at the tip circle diameter 25 of the internal tooth systems 24 and 24' and the bearing surfaces or contact points of further elements 30 of the vehicle transmission 29, there is an air gap 32, and the tooth tip surfaces at the tip circle diameter 25 of the internal tooth systems 24 and 24' thus remain contact-free. Only in this way does it always remain ensured that torque transmission takes place exclusively via the tooth flanks 27 of the internal tooth system 24 or 24'.

Figure 2:
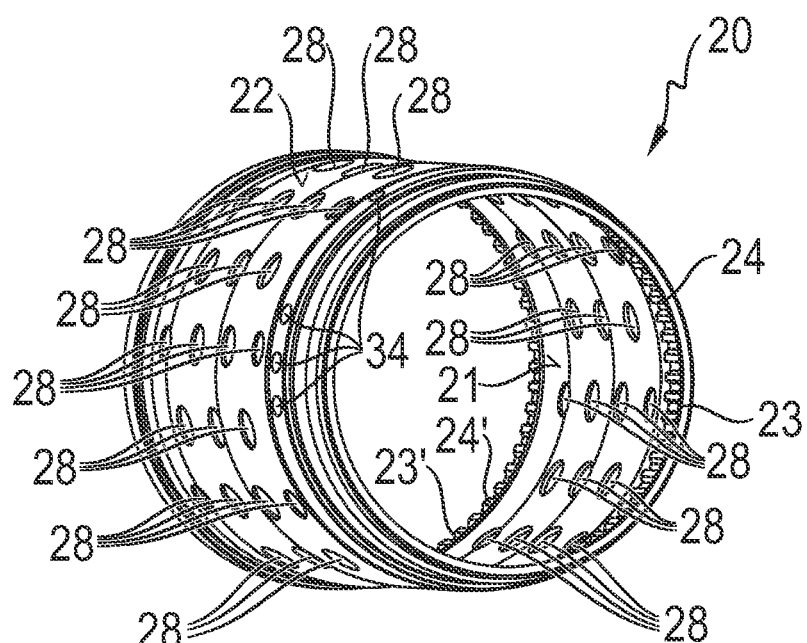
FIG. 2 shows, by way of example, one possible exemplary arrangement of a cylindrical hollow body according to the disclosure.

FIG. 2 shows, by way of example, one possible exemplary arrangement of a cylindrical hollow body 20 according to the disclosure. The illustrated hollow body 20 is constructed of an aluminium alloy, for example of AlSi9Cu3(Fe), and was produced by a diecasting process. It has an inner lateral surface 21 and an outer lateral surface 22, both of which have been finished-turned as part of a machining process on the hollow body 20. Only a first subregion 23 and a second subregion 23', each of which also has an internal tooth system 24, 24', have remained un-finish-turned or unmachined, i.e., still in the unfinished state. Here, the internal tooth systems 24, 24' have already been produced during the casting process. Furthermore, it can be seen that the hollow body 20 has a multiplicity of bores 28. Here, the bores 28 have different diameters and are used, on the one hand, to reduce the weight of the hollow body 20 and, on the other hand, to drain oil from the hollow body 20 when the hollow body 20 is used in the vehicle transmission 29. In addition, balancing bores 34 can be seen, which are arranged primarily as close as possible to each subregion 23, 23' or to each internal tooth system 24, 24' of the hollow body 20. The balancing bores 34 can have different diameters depending on the material removal required and serve to improve the, in particular, acoustic true running properties of the hollow body 20 in the vehicle transmission 29. In addition, however, balancing bores 34 also con-tribute to further weight reduction of the hollow body 20 and to further improved oil drainage from the hollow body 20.

Figure 3:
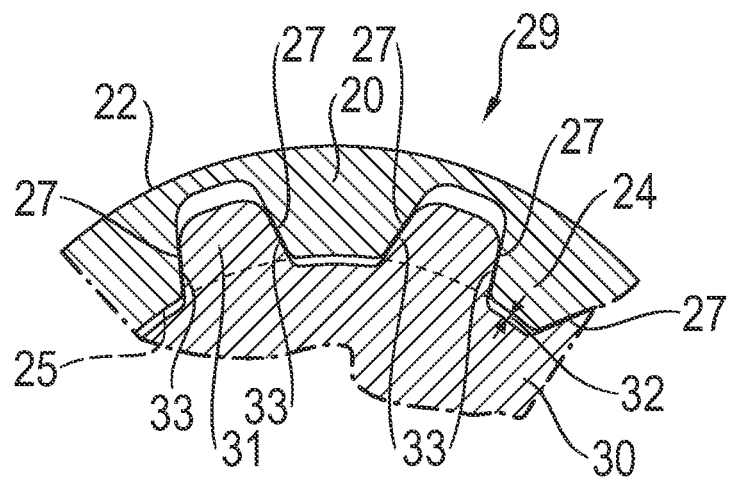
FIG. 3 shows, by way of example and schematically, a segment of a hollow body according to the disclosure after its arrangement in a vehicle transmission.

FIG. 3 shows, by way of example and schematically, a segment of a hollow body 20 according to the disclosure after its arrangement in a vehicle transmission 29. Here too, the vehicle transmission 29 is shown only in part and in the form of the hollow body 20 and the toothed disk 30. As can be seen, the hollow body 20 has an internal tooth system 24 in the illustrated subregion 23 which is in engagement with a mating tooth system 31 of the toothed disk 30. The internal tooth system 24 acts with the mating tooth system 31 of the toothed disk 30 as a spline system to ensure a ro-tationally secure connection. In this case, the subregion 23 is assigned to the inner lateral surface 21, The hollow body 20 also has an outer lateral surface 22. The internal tooth system 24 has a tip circle diameter 25 (illustrated by a dashed line), which is used exclusively for clamping during machining of the hollow body 20. After the arrangement of the hollow body 20 in the vehicle transmission 29, the tip circle diameter 25 or the tooth tip surfaces of the tip circle diameter 25 of the internal tooth system 24 no longer has/have any function. Accordingly, the tip circle diameter 25 remains contact-free, thus creating an air gap 32 between the surfaces of the internal tooth system 24 in the region of the tip circle diameter 25 and that of the toothed disk 30. Tooth flanks 27 of the internal tooth system 24 of the hollow body 20, on the other hand, bear against mating flanks 33 of the toothed disk 30. These contact surfaces of the tooth flanks 27 of the internal tooth system 24 and of the mating flanks 33 of the toothed disk 30 serve to transmit torques. On the other hand, the tooth flanks 27 do not have any function during the machining of the ring gear 20.

The invention claimed is:

1. A method for producing and machining a cylindrical hollow body constructed of aluminium or an aluminium alloy and for arranging said hollow body in a motor vehicle transmission, the method comprising: providing a hollow body that is produced by a casting process such that the hollow body has an inner and an outer lateral surface and has an internal tooth system in at least one subregion of the inner lateral surface, clamping the hollow body centrally for machining, and arranging the hollow body in a vehicle transmission by the tooth flanks of the internal tooth system, wherein the clamping of the hollow body is done centrally is done on a tip circle diameter of the internal tooth system.

2. The method as claimed in claim 1, wherein the casting process is carried out as a diecasting process.

3. The method as claimed claim 1, wherein the inner lateral surface is finish-turned as part of the machining of the hollow body, but the at least one subregion remains un-finish-turned.

4. The method as claimed in claim 1, wherein the hollow body is balanced as part of the machining process.

5. The method as claimed in claim 1, wherein the production of the hollow body takes place such that the tip circle diameter remains contact-free after the hollow body has been arranged in the vehicle transmission.

6. The method as claimed in claim 1, wherein the production of the hollow body takes place such that the hollow body has an internal tooth system in each of two subregions of the inner lateral surface.

7. The method as claimed in claim 1, wherein the hollow body undergoes at least one deburring, brushing, and washing as part of the machining of the hollow body.

8. The method as claimed claim 1, wherein the outer lateral surface is finish-turned as part of the machining of the hollow body, but the at least one subregion remains un-finish-turned.

9. The method as claimed in claim 1, wherein the inner and outer surfaces are finished-turned as part of the machining of the hollow body, but at least one subregion remains un-finish-turned.

10. The method as claimed claim 2, wherein the outer lateral surface is finish-turned as part of the machining of the hollow body, but the at least one subregion remains un-finish-turned.

11. The method as claimed in claim 2, wherein the inner and outer surfaces are finished-turned as part of the machining of the hollow body, but at least one subregion remains un-finish-turned.

12. The method as claimed in claim 1, wherein at least one of the inner and outer surfaces are finished-turned as part of the machining of the hollow body, but at least one subregion remains un-finish-turned.

13. The method as claimed in claim 12, wherein the hollow body is balanced as part of the machining process.

14. The method as claimed in claim 13, wherein the hollow body undergoes at least one deburring, brushing, and washing as part of the machining of the hollow body.

15. The method as claimed in claim 2, wherein the hollow body is balanced as part of the machining process.

16. The method as claimed in claim 3, wherein the hollow body is balanced as part of the machining process.

17. The method as claimed in claim 3, wherein the hollow body undergoes at least one deburring, brushing, and washing as part of the machining of the hollow body.

18. The method as claimed in claim 1, wherein the production of the hollow body takes place such that the hollow body has an internal tooth system in each of two subregions of the inner lateral surface and the tip circle diameter remains contact-free after the hollow body has been arranged in the vehicle transmission.

* * * * *